United States Patent
Russo

(10) Patent No.: US 11,017,204 B2
(45) Date of Patent: *May 25, 2021

(54) SYSTEMS AND METHODS FOR SPOOF DETECTION BASED ON LOCAL BINARY PATTERNS

(71) Applicant: Synaptics Incorporated, San Jose, CA (US)

(72) Inventor: Anthony P. Russo, New York, NY (US)

(73) Assignee: Synaptics Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/286,974

(22) Filed: Feb. 27, 2019

(65) Prior Publication Data

US 2019/0197280 A1 Jun. 27, 2019

Related U.S. Application Data

(63) Continuation of application No. 15/388,722, filed on Dec. 22, 2016, now Pat. No. 10,262,187.

(Continued)

(51) Int. Cl.
*G06K 9/00* (2006.01)
*G06K 9/46* (2006.01)
(Continued)

(52) U.S. Cl.
CPC ........... *G06K 9/001* (2013.01); *G06K 9/0002* (2013.01); *G06K 9/00114* (2013.01);
(Continued)

(58) Field of Classification Search
CPC ............... G06K 9/001; G06K 9/00899; G06K 9/00926; G06K 9/4642; G06K 9/52;
(Continued)

(56) References Cited

U.S. PATENT DOCUMENTS

| 7,505,613 | B2 | 3/2009 | Russo | |
|---|---|---|---|---|
| 7,668,350 | B2* | 2/2010 | Rowe | G06K 9/00046 382/124 |

(Continued)

FOREIGN PATENT DOCUMENTS

| CN | 104361319 A | * | 2/2015 | |
|---|---|---|---|---|
| WO | WO-2016104712 A1 | * | 6/2016 | G06K 9/40 |

OTHER PUBLICATIONS

An investigation of local descriptors—spoofing detection, Gragnaniello et al, IEEE, 2015, pp. 1-15 (Year: 2015).*

(Continued)

*Primary Examiner* — Jayesh A Patel
(74) *Attorney, Agent, or Firm* — Leydig, Voit & Mayer, Ltd.

(57) ABSTRACT

Disclosed are systems and methods for performing spoof detection. The method includes: receiving, by a processor from a biometric sensor, an input image of a biometric; analyzing the input image to identify pixels associated with a first feature in the input image; performing a local binary pattern (LBP) analysis on the pixels associated with the first feature, which comprises computing, for a given pixel associated with the first feature, an LBP value corresponding to texture of one or more neighboring pixels around the given pixel, wherein the neighboring pixels around the given pixel comprise eight pixels around the given pixel, including pixels on a top, a bottom, a left, a right, and at four corners of a location of the given pixel; and, determining whether the input image is a replica of the biometric based on results of performing the LBP analysis on the pixels associated with the first feature.

18 Claims, 6 Drawing Sheets

Related U.S. Application Data

(60) Provisional application No. 62/420,518, filed on Nov. 10, 2016.

(51) Int. Cl.
   G06K 9/52 (2006.01)
   G06T 7/40 (2017.01)

(52) U.S. Cl.
   CPC ..... G06K 9/00899 (2013.01); G06K 9/00926 (2013.01); G06K 9/46 (2013.01); G06K 9/4642 (2013.01); G06K 9/52 (2013.01); G06T 7/40 (2013.01); G06K 2009/4666 (2013.01)

(58) Field of Classification Search
   CPC .......... G06K 2009/4666; G06K 9/0008; G06T 7/40; G06T 7/44
   See application file for complete search history.

(56) References Cited

U.S. PATENT DOCUMENTS

| | | | |
|---|---|---|---|
| 8,363,983 B2* | 1/2013 | Jeon | G06K 9/00281 382/298 |
| 8,861,853 B2* | 10/2014 | Kawai | G06K 9/3241 382/170 |
| 9,053,384 B2* | 6/2015 | Cao | G06K 9/56 |
| 9,639,765 B2* | 5/2017 | Du | G06K 9/00107 |
| 9,721,150 B2* | 8/2017 | Gottemukkula | G06K 9/0061 |
| 9,747,518 B2* | 8/2017 | Zhao | G06T 7/001 |
| 9,818,020 B2* | 11/2017 | Schuckers | G06K 9/00107 |
| 2007/0036401 A1* | 2/2007 | Hara | G06K 9/00073 382/125 |
| 2009/0074259 A1 | 3/2009 | Baltatu et al. | |
| 2010/0131273 A1 | 5/2010 | Aley-Raz et al. | |
| 2010/0202693 A1* | 8/2010 | Song | G06K 9/6256 382/190 |
| 2010/0329517 A1* | 12/2010 | Zhang | G06K 9/00248 382/118 |
| 2013/0142426 A1* | 6/2013 | Kaneda | G06K 9/4642 382/165 |
| 2013/0163831 A1* | 6/2013 | Tanaka | G06K 9/00926 382/118 |
| 2013/0163870 A1* | 6/2013 | Cao | G06K 9/00281 382/170 |
| 2014/0193071 A1* | 7/2014 | Cho | G06K 9/00771 382/170 |
| 2014/0270419 A1* | 9/2014 | Schuckers | G06K 9/00114 382/124 |
| 2014/0270551 A1* | 9/2014 | Baranowski | G06K 9/6256 382/226 |
| 2014/0294262 A1* | 10/2014 | Schuckers | G06K 9/00073 382/125 |
| 2014/0294293 A1* | 10/2014 | Yamamura | G06K 9/00228 382/159 |
| 2015/0279039 A1* | 10/2015 | Nakashima | G06K 9/6257 382/197 |
| 2015/0286892 A1* | 10/2015 | Ohno | G06K 9/4642 382/170 |
| 2016/0070967 A1* | 3/2016 | Du | G06T 7/32 382/124 |
| 2016/0092735 A1* | 3/2016 | Govil | G06K 9/3233 382/103 |
| 2016/0166026 A1 | 6/2016 | Webster | |
| 2016/0171323 A1* | 6/2016 | Gadde | G06K 9/4638 382/117 |
| 2016/0180142 A1* | 6/2016 | Riddle | G06K 9/00375 382/124 |
| 2016/0210493 A1* | 7/2016 | Walch | G06K 9/228 |
| 2016/0217319 A1* | 7/2016 | Bhanu | G06K 9/00281 |
| 2016/0378244 A1* | 12/2016 | Bandyopadhyay | G06F 21/32 345/177 |
| 2017/0004346 A1* | 1/2017 | Kim | G06K 9/00926 |
| 2017/0280079 A1* | 9/2017 | Fu | H04N 5/378 |
| 2017/0344846 A1* | 11/2017 | Yoshida | G06K 9/40 |
| 2018/0060648 A1* | 3/2018 | Yoo | G06K 9/00899 |
| 2018/0089527 A1* | 3/2018 | Aoki | G06K 9/6247 |

OTHER PUBLICATIONS

Experimental—Detection, Ghiani et al., Springer, 2012, pp. 210-218 (Year: 2012).*
Texture and Wavelet—systems, Nikam et al., IEEE computer society, 2008, pp. 675-680 (Year: 2008).*
Multi-scale—fingerprint, Jia et al., Elsevier, 2014, pp. 91-102 (Year: 2014).*
Local binary patterns, Matti Pietikainen, Scholarpedia, 10.4249/scholarpedia 9775, 2010, pp. 1-4 (Year: 2010).*
Implementation of fingerprint recognition system using LBP Descriptor, Alima Masmoudi et al., Compass, vol. 38, Issue 3, May 2010, pp. 1-2 (Year: 2010).*
Implementation of fingerprint recognition system using LBP Descriptor, Alima Masmoudi et al., Journal of Testing and Evaluation, vol. 38, Issue 3, 2010, pp. 369-382 (Year: 2010).*
A Survey on Antispoofing Schemes for Fingerprint Recognition Systems, Emanuela Marasco et al., ACM, Nov. 2014, p. 28 : 1-28:36 (Year: 2014).*
Palm Print Recognition—Network, Prasetya Aria Wibawa et al., IEEE, 978-1-4799-6526-7, Nov. 2014, pp. 105-110 (Year: 2014).*
Mair, et al. "Adaptive and Generic Corner Detection Based on the Accelerated Segment Test," Proceeding ECCV'10, Proceedings of the 11th European Conference on Computer Vision: Part II, Heraklion, Crete, Greece, pp. 183-196 (Sep. 5-11, 2010).
Leutenegger, et al. "BRISK: Binary Robust Invariant Scalable Keypoints," 2011 IEEE International Conference on Computer Vision (ICCV) (Nov. 6-13, 2011).
Ojala, et al. "Multiresolution Gray Scale and Rotation Invariant Texture Classification with Local Binary Patterns," IEEE Transactions on Pattern Analysis and Machine Intelligence, vol. 24, Iss. 7, pp. 971-987 (Jul. 2002).
Dalal, et al. "Histograms of Oriented Gradients for Human Detection," IEEE Computer Society Conference on Computer Vision and Pattern Recognition 2005 (CVPR 2005) (Jun. 20-25, 2005).
Fisher, Bob. "Derivatives and Gradients" (Dec. 17, 1997) (available at: http://homepages.inf.ed.ac.uk/rbf/CVonline/LOCAL_COPIES/BASICMAT/node5.html).
Ghiani, et al. "Experimental Results on Fingerprint Liveness Detection," Proceeding AMDO '12, Proceedings of the 7th international conference on Articulated Motion and Deformable Objects, Mallorca, Spain, pp. 210-218 (Jul. 11-13, 2012).
Gottschlich, et al. "Fingerprint Liveness Detection based on Histograms of Invariant Gradients," 2014 IEEE International Joint Conference on Biometrics (IJCB) (Sep. 29-Oct. 2, 2014).
Wikipedia, "Image Gradient," as last modified on Sep. 15, 2016.
Pietikäinen, Matti. "Local Binary Patterns," Scholarpedia, vol. 5, No. 3 (2010).
Gragnaniello, et al. "An investigation of local descriptors for biometric spoofing detection," IEEE Transactions on Information Forensics and Security, vol. 10, Iss. 4, pp. 849-863 (2015).
Decann, et al. "A Novel Region Based Liveness Detection Approach for Fingerprint Scanners," Proceeding ICB '09, Proceedings of the Third International Conference on Advances in Biometrics, Alghero, Italy, pp. 627-636 (Jun. 2-5, 2009).
Ghiani, Luca, et al. "Livdet 2013 fingerprint liveness detection competition 2013," 2013 *International Conference on Biometrics (ICB)*, IEEE, 2013.
Mura, Valerio, et al. "LivDet 2015 fingerprint liveness detection competition 2015." *Biometrics Theory, Applications and Systems (BTAS), 2015 IEEE 7th International Conference on*. IEEE, 2015.
Gragnaniello et al., "An investigation of local descriptors—spoofing detection," IEEE, 2015, pp. 1-15 (2015).
Ghiani et al., "Experimental—Detection," Springer (2012), pp. 210-218.
Nikam et al., "Texture and Wavelet—Systems," IEEE, computer society, 2008, pp. 675-680.

(56) References Cited

OTHER PUBLICATIONS

Jia et al., "Multi-scale—fingerprint," Elsevier, 2014, pp. 91-102.

* cited by examiner

SYSTEMS AND METHODS FOR SPOOF DETECTION BASED ON LOCAL BINARY PATTERNS

CROSS-REFERENCE TO RELATED APPLICATIONS

This application is a continuation of U.S. application Ser. No. 15/388,722, filed on Dec. 22, 2016, which claims the benefit of U.S. Provisional Application No. 62/420,518, filed on Nov. 10, 2016, both of which are hereby incorporated by reference in their entirety.

FIELD

This disclosure generally relates to biometric sensors and, more particularly, to systems and methods for spoof detection based on local binary patterns.

BACKGROUND

Biometric authentication systems are used for authenticating and/or verifying users of devices incorporating the authentication systems. Biometric sensing technology provides a reliable, non-intrusive way to verify individual identity for recognition purposes.

Fingerprints, like various other biometric characteristics, are based on distinctive personal characteristics and are, thus, a reliable mechanism for recognizing an individual. There are many potential applications for using fingerprint sensors. For example, fingerprint sensors may be used to provide access control in stationary applications, such as security checkpoints. Electronic fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require authentication systems that are both small in size and highly reliable.

Biometric "spoofing" is any attempt to circumvent biometric security using a replica of a user's sensed biometric. In the context of fingerprint authentication systems, some examples of spoofing materials include a three-dimensional (3D) gelatin mold of a finger, a graphite mold of a finger, a wood glue mold of a finger, and printed two-dimensional (2D) image of a finger, among others. In the context of facial recognition, an example spoofing material could be a photo of person's face. In the context of voice recognition, an example spoofing material could be a vocal imitation or playback.

In order to maintain the integrity of biometric authentication systems, there is a need for anti-spoofing systems and methods, also referred to as "liveness detection", that can detect when an authentication attempt is a spoof and, upon spoof detection, properly deny authentication.

SUMMARY

One embodiment provides a device, comprising a biometric sensor and a processing system. The processing system is configured to: receive, from the biometric sensor, an input image of a biometric; analyze the input image to identify pixels associated with a first feature in the input image; perform a local binary pattern (LBP) analysis on the pixels associated with the first feature comprising computing, for a given pixel associated with the first feature, an LBP value corresponding to texture of one or more neighboring pixels around the given pixel; and, determine whether the input image is a replica of the biometric based on results of performing the LBP analysis on the pixels associated with the first feature.

Another embodiment provides a method for performing spoof detection. The method includes: receiving, by a processor from a biometric sensor, an input image of a biometric; analyzing, by the processor, the input image to identify pixels associated with a first feature in the input image; performing, by the processor, a local binary pattern (LBP) analysis on the pixels associated with the first feature, which comprises computing, for a given pixel associated with the first feature, an LBP value corresponding to texture of one or more neighboring pixels around the given pixel, wherein the neighboring pixels around the given pixel comprise eight pixels around the given pixel, including pixels on a top, a bottom, a left, a right, and at four corners of a location of the given pixel; and, determining, by the processor, whether the input image is a replica of the biometric based on results of performing the LBP analysis on the pixels associated with the first feature. Some embodiments further include a non-transitory computer-readable storage medium storing instructions that, when executed by a processor, perform the method for spoof detection.

DETAILED DESCRIPTION

Figure 1:
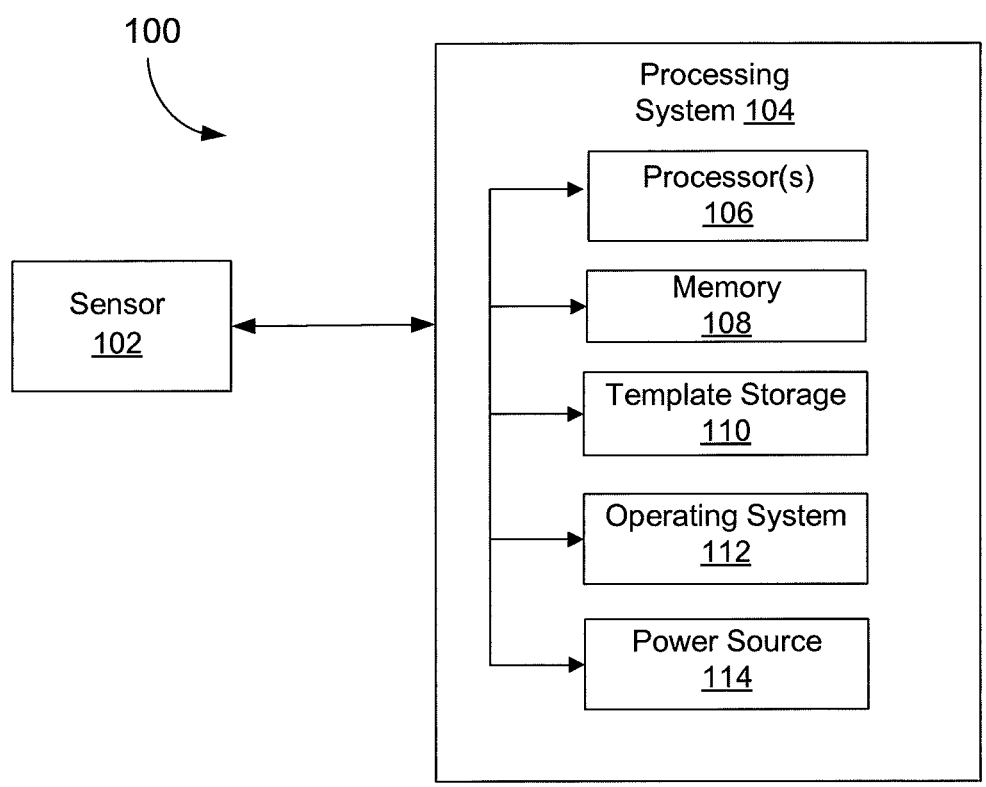
FIG. 1 is a block diagram of an example of a device that includes an optical sensor and a processing system according to an embodiment.

The following detailed description is merely exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description. Turning to the drawings, and as described in greater detail herein, embodiments provide systems and methods for a metric for spoof detection.

Fingerprint images can have considerable variation from person to person, from sensor to sensor, and even from different images for the same person. This variation reflects the fact that a person's finger is a living thing and changes as the finger responds to external factors, such as sweating, stretching when touched, etc. When a finger is imaged with a fingerprint sensor, these changes are captured to some extent and, hence, the sensed images include some variation, even with different impressions of the same finger. Also, different sensors from the same sensing technology can add small differences.

The goal of a robust fingerprint matcher is to be agnostic to many of these changes for the same finger, which improves the usability of the system for a genuine user. However, if spoofs are constructed, e.g., with latent prints from the user, the spoof images can be sufficiently similar to the real finger that they can be used to gain entry into the system. Fingerprint anti-spoof technology attempts to distinguish images from spoof fingers from those of live fingers by deriving properties from the images that can be used to differentiate them.

As described, anti-spoof technology helps to improve the security of a biometric authentication system by preventing a successful authentication using a spoofed fingerprint, for example a spoof fingerprint created using the latent fingerprint of a genuine user of the device. Since the spoof fingerprint is a copy of the fingerprint that is enrolled on the device, without anti-spoof technology, a fingerprint matcher could match the spoofed fingerprint image to an enrolled image and grant access to the device.

Anti-spoof technology analyzes features in the spoof fingerprint image and attempts to distinguish the spoof fingerprint image from an image of a real finger. Described embodiments provide a system and method for spoof detection.

Once the metric is computed, the metric can be input to a "classifier," which produces a score that can be compared against a threshold to determine if the finger is a live finger or a spoof. In some implementations, many different metrics are input into the classifier, and the classifier is configured to compute an overall liveness score based on the combination of metrics. In one example, the classifier is a neural network, but any classifier is within the scope of the disclosure. The classifier itself can be developed using machine learning methods, where a training set and a test set are created to train and validate the classifier performance.

Recognizing that spoof detection is an important part of the overall security of fingerprint systems, embodiments provide improved systems and methods for analyzing the images (e.g., fingerprint images) using Local Binary Patterns (LBP) to detect spoofs. LBP is a method of texture analysis that is generally robust and efficient. In conventional approaches, LBP (and similar methods) typically divide an image into small, tessellated rectangular or circular patches and make decisions on each patch. For example, LBP is often used in facial recognition systems to make a decision as to which facial features are included in a given patch, e.g., eye, nose, mouth, etc.

Embodiments described herein, by contrast, provides a spoof detection technique that applies LBP, or other texture analysis, to certain portions of images. In the context of fingerprints, embodiments of the disclosure may apply LBP to only the fingerprint ridges, rather than to patches that cover the entire image, thereby focusing the spoof detection analysis directly on the areas that are important for spoof detection. In some implementations involving fingerprint images, the most discerning information used to distinguish spoofs from real fingers is concentrated along the pixels where the material touches the sensor (i.e., the fingerprint ridges). Embodiments provide an improved way to get cleaner, more useful spoof-detection results using LBP processing on just those pixels of interest.

In certain embodiments, instead of using LBP in fixed patches (e.g., rectangles or circles) without regard to what is contained in the patches, the discriminatory power of LBP can be focused on the areas where the important information resides. This focus makes the results of the LBP analysis more unique (i.e., provides as stronger signal), as it contains fewer results from uninteresting pixels. This increased uniqueness results in better overall spoof detection accuracy.

Turning to the figures, FIG. 1 is a block diagram of an example of an electronic device 100 that includes a sensor device 102 and a processing system 104, according to an embodiment. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. The enrollment views can include multiple images of the same finger. Further, the enrollment views can include view of multiple different fingers of the user. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. The processing system 104, although shown as including a processor 106 and memory 108, may further include a microprocessor, microcontroller and/or dedicated circuitry.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Sensor device 102 can be implemented as a physical part of the electronic device 100, or can be physically separate from the electronic device 100. As appropriate, the sensor device 102 may communicate with parts of the electronic device 100 using any one or more of the following: buses, networks, and other wired or wireless interconnections. In some embodiments, sensor device 102 is implemented as a fingerprint sensor to capture a fingerprint image of a user. In accordance with the disclosure, the sensor device 102 uses optical sensing for the purpose of object imaging including imaging biometrics such as fingerprints. The sensor device 102 can be incorporated as part of a display, for example, or may be a discrete sensor. In some embodiments, the sensor device 102 may perform optical imaging. In various other embodiments, the sensor device 102 can be replaced with a capacitive sensor device, ultrasonic sensor device, or another sensor device that uses some other sensing technology for object imaging, as described in greater detail herein.

The electronic device 100 may utilize any suitable combination of sensor components and sensing technologies to detect user input in the sensing region. Some implementations utilize arrays or other regular or irregular patterns of multiple sensing elements to detect the input. Example sensing techniques that the electronic device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastic sensing techniques, magnetic sensing techniques, and/or radar sensing techniques.

For example, the electronic device 100 may use resistive sensing techniques where contact from an input object closes an electrical circuit and can be used to detect input. In one example technique, the sensor device 102 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the electronic device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the electronic device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One example acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the electronic device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the electronic device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include composite input devices, such as physical keyboards and separate joysticks or key switches. Further example electronic devices 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

Figure 2:
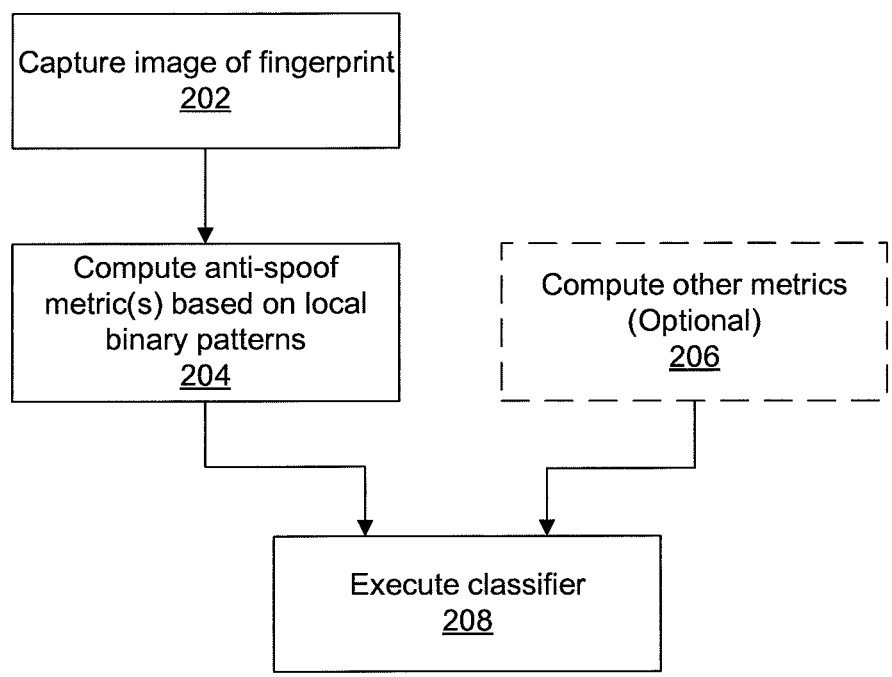
FIG. 2 is a block diagram illustrating a system and method for spoof detection according to an embodiment.

FIG. 2 is a block diagram illustrating a system and method for spoof detection according to an embodiment. At step 202, a sensor captures an image of a fingerprint. The fingerprint can be either from a live finger or a spoofed finger. At step 204, a processor computes one or more anti-spoof metrics based on local binary patterns, as described in greater detail below. The one or more anti-spoof metrics computed at step 204 are passed to a classifier. Optionally, at step 206, the processor may compute other anti-spoof metrics and also pass them to the classifier. At step 208, the processor executes the classifier to determine whether the image of the fingerprint captured at step 202 is from a live finger or a spoofed finger.

Figure 3:
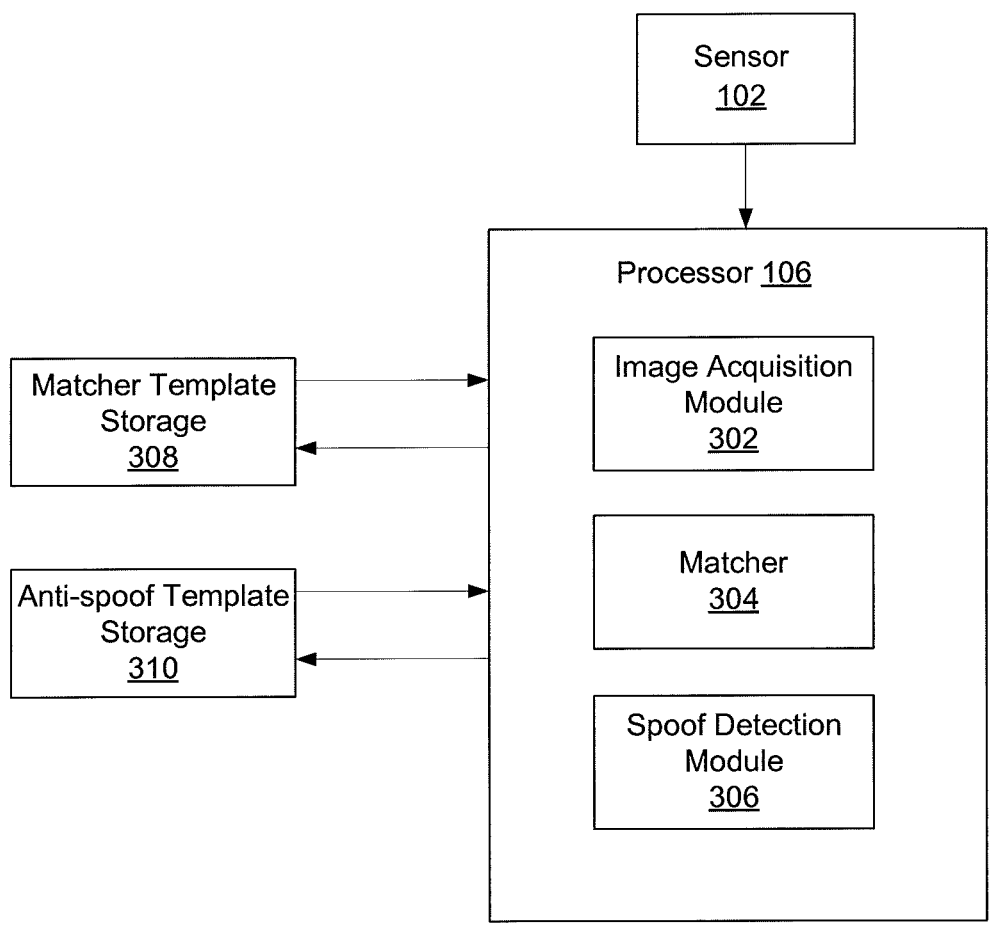
FIG. 3 is a block diagram of a spoof detection system, according to an embodiment.

FIG. 3 is a block diagram of a spoof detection system, according to an embodiment. The system includes a sensor device 102 and a processor 106. The processor 106 is configured to execute one or more software functional blocks, including an image acquisition module 302, a matcher 304, and a spoof detection module 306. The image acquisition module 302, the matcher 304, and the spoof detection module 306 are implemented as software instructions stored in a memory and executed by one or more processors 106. It is understood that each of the functional blocks may be also implemented by dedicated circuitry instead of or in combination with software.

Although shown as separate function blocks in FIG. 3, two or more of the image acquisition module 302, the matcher 304, and the spoof detection module 306 may be executed together as a single software module, application, or operating system. Alternatively, the image acquisition module 302, the matcher 304, and the spoof detection module 306 may be executed separately and/or provided by different software vendors. Also, in some embodiments, multiple processors 106 may be used to execute one or more of the image acquisition module 302, the matcher 304, and the spoof detection module 306.

In some embodiments, an input image, such as a fingerprint image, is captured by the sensor device 102. The input image is passed to the image acquisition module 302, which determines whether the image is an enrollment image or a verification image. If the input image is an enrollment image, a template associated with the input image is stored in a matcher template storage 308 and/or the matcher template storage 308 is updated based on the new input image.

If the input image is a verification image, the image acquisition module 302 passes the input image to the matcher 304, which is configured to determine whether the input image matches any of the enrollment images stored in the matcher template storage 308. In one implementation, the matcher 304 may compare the input image to the enrollment image to determine a difference between the images. In some embodiments, if the difference is below a threshold, a match is found; otherwise, there is no match. In other embodiments, various techniques other than a comparison to a threshold can be used to determine whether the input image is a match to any of the enrollment images. Many different techniques can be used to execute the matcher 304, including point-based techniques, ridge-based techniques, or a combination of point-based and ridge-based techniques.

In one implementation, before the matcher 304 can compare the input image to the stored enrollment images (or "templates"), the matcher 304 performs alignment. An alignment that most closely aligns the input image to one of the enrollment images is determined, and transformation corresponding to the alignment is applied to the input image. The transformation T can be represented by $T=(T_x, T_y, \theta)$, where $T_x$ is a translation in the horizontal direction, $T_y$ is a translation in the vertical direction, and $\theta$ is a rotation. This process is known as image alignment. Various techniques may be used by the matcher 304 to compute the image alignment.

In one embodiment, after the matcher 304 performs image alignment, the matcher 304 makes a match/non-match decision. In other embodiments, the matcher generates a match score and returns the match score to another entity of the system that called the matcher 304 (e.g., the image acquisition module 302), where the other entity makes the match/non-match decision based on the match score. The match/non-match decision may be based on comparing overlapping regions of the input image and the enrollment image. In one implementation, the matcher 304 may compare the overlapping regions of the aligned input image to the enrollment image to determine a difference between the images. In some embodiments, if the difference is below a threshold, a match is found; otherwise, there is no match. It should be understood that many different techniques can be used for matching and are also within the scope of the disclosure.

In some embodiments, for enrollment images, the image acquisition module 302 also passes the input image to the spoof detection module 306, which may extract anti-spoof metrics from the input image. Example anti-spoof metrics include: an average gray level of ridges, an average gray level of valleys, one or more values as to whether the input image includes blurred areas, one or more values as to whether the input image includes relative lighter areas, one or more values as to whether the input image includes relative darker areas, texture information (for example, by computing LBP (linear binary patterns) on portions of the input image, among others. In some implementations, the anti-spoof metrics may not be discerning enough to provide adequate fingerprint matching results, i.e., since many spoofed images could satisfy a matcher that relied solely on anti-spoof metrics for matching.

The anti-spoof metrics extracted from the input image by the spoof detection module 306 are stored in an anti-spoof template in the anti-spoof template storage 310. In some embodiments, the metrics extracted from the input image can be combined with the anti-spoof metrics in the anti-spoof template, for example by averaging the metrics extracted from the input image and the anti-spoof metrics in the anti-spoof template, to generate an updated anti-spoof template. Some embodiments do not store an anti-spoof template, and the spoof/non-spoof decision is based solely on the input image.

In one implementation, the matcher template storage 308 and the anti-spoof template storage 310 comprise one storage device. In another implementation, the matcher template storage 308 and the anti-spoof template storage 310 comprise separate storage devices.

In addition, in one implementation, when a user is enrolling enrollment images, the same images are used for updating the matcher template storage 308 and the anti-spoof template storage 310. In other implementations, separate enrollment processes are used to update the matcher template storage 308 and the anti-spoof template storage 310. As such, a given enrollment image could be used to update just one or both of the matcher template storage 308 and the anti-spoof template storage 310. However, as described, other embodiments do not store any anti-spoof templates, and the spoof/non-spoof decision is based solely on the input image.

In some embodiments, if the matcher 304 does not find a match in the matcher template storage 308, then the matcher 304 takes an appropriate action, such as, for example, denying entry to a mobile device. If the matcher 304 finds a match, then the spoof detection module 306 is configured to determine whether the input image is a spoof of a live finger, i.e., whether image is that of a real live finger or a other non-derma-based material, such as gelatin or wood glue.

In some embodiments, the spoof detection module 306 is executed as part of the matcher 304. In other embodiments, the spoof detection module 306 is executed separately from the matcher 304.

In some embodiments, the spoof detection module 306 is executed after the matcher 304 finds a positive match. In other embodiments, the spoof detection module 306 is executed before the matcher 304 makes a match/non-match decision. In still further embodiments, the spoof detection module 306 and the matcher 304 are executed in parallel.

As described in greater detail herein, the spoof detection module 306 is configured to analyze an input image (e.g., a fingerprint image) using Local Binary Patterns (LBP) to compute one or more spoof detection metrics. The one or more spoof detection metrics are passed to a classifier that makes the anti-spoof decision.

Also, in some embodiments, the match/non-match decision of the matcher is made by a classifier associated with the matcher, which is the same classifier that makes the spoof/non-spoof decision. In other embodiments, the match/non-match decision is made by a different classifier than the classifier that makes the spoof/non-spoof decision.

As described, embodiments provide improved systems and methods for analyzing images (e.g., fingerprint images) using Local Binary Patterns (LBP) to detect spoofs. According to some embodiments, processing is performed to identify which pixels in an image are part of ridges and which pixels are part of valleys. In some embodiments, identifying the pixels in the image that are part of ridges and the pixels in the image that are part of valleys results in a binary image, where ridge pixels are black and valley pixels are white. In some embodiments, the ridges can be thinned to a single pixel wide, into what is called a skeleton image (also called medial axis image or thinned image). Thinning a ridge essentially provides the center of each ridge. An optional but useful step in some fingerprint processing systems is to determine the contour around each ridge. The contour includes the border pixels where the ridge meets the valley.

Figure 4A:
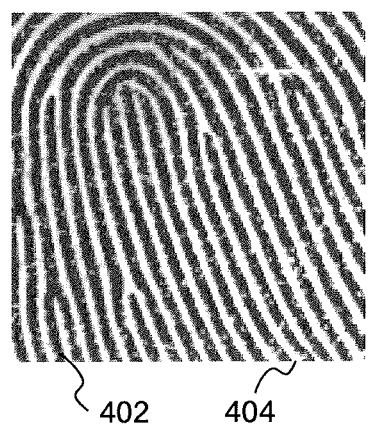
FIG. 4A illustrates a grayscale fingerprint image that shows various ridges and valleys of a fingerprint, according to one embodiment.

FIG. 4A illustrates a grayscale fingerprint image that shows various ridges 402 (dark) and valleys 404 (light) of a fingerprint, according to one embodiment. As can be seen in FIG. 4A, the ridges 402 and/or valleys 404 contain texture. In other words, the ridges 402 and/or valleys 404 may not be uniform along their length. Some embodiments attempt to characterize an image as of a real finger or as of a spoofed finger based on the variation in the texture of certain portions of the image, for example, by examining the texture of the ridge pixels.

Figure 4B:
FIG. 4B is a binary version of the grayscale fingerprint shown in FIG. 4A, according to one embodiment.

FIG. 4B is a binary version of the grayscale fingerprint shown in FIG. 4A, according to one embodiment. In some embodiments, the binary version includes a black pixel at the ridge pixels in the image and a white pixel elsewhere. Various techniques known in the art may be used to obtain the binary version of the grayscale fingerprint. For example, in one implementation, the binary version is obtained by thresholding a raw or smoothed grayscale version of the input image, such that all the pixels having an intensity at or above the threshold value are set to black, and all the pixels below the threshold value are set to white. In some implementations, the binary version may optionally include a mask that has a fixed gray value (e.g., 127 for a 256 bit image) for pixels that have no finger present (i.e. background pixels). The mask may be stored in a separate image or in a list of mask pixel locations.

Figure 4C:
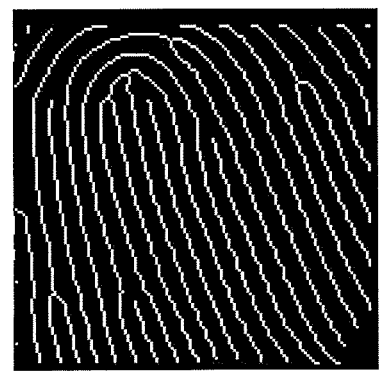
FIG. 4C illustrates a skeletonized version of the grayscale fingerprint image in FIG. 4A, according to one embodiment.

FIG. 4C illustrates a skeletonized version of the grayscale fingerprint image in FIG. 4A, according to one embodiment. In one implementation, fingerprint skeletonization, also referred to as thinning, is the process of converting the ridges in a fingerprint image to a binary representation (e.g., FIG. 4B), and then reducing the width of the binarized ridge lines to one pixel wide. In another implementation of fingerprint skeletonization, the one pixel wide ridges can be obtained from a grayscale image, e.g., by thresholding the grayscale image to capture the pixels near the center of a ridge and avoid capturing most of the other ridge pixels.

Figure 5:
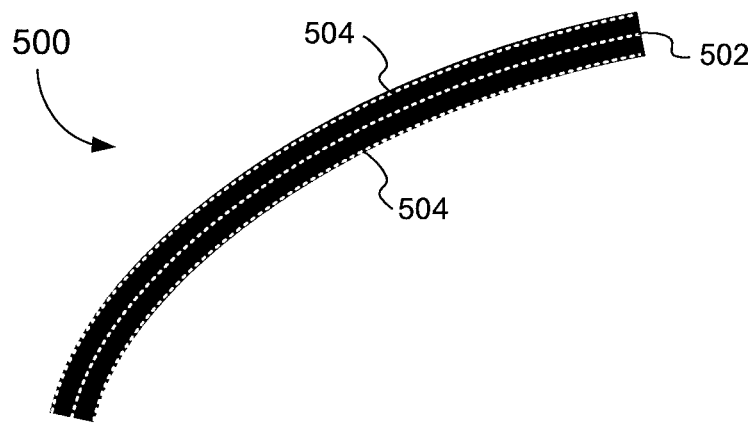
FIG. 5 illustrates an example fingerprint ridge, according to one embodiment.

FIG. 5 illustrates an example fingerprint ridge 500, according to one embodiment. In one embodiment, the fingerprint ridge 500 is taken from the binary version of the grayscale fingerprint. As shown, the fingerprint ridge 500 includes skeleton pixels 502 and fingerprint ridge contour pixels 504. The skeleton pixels 502 of the fingerprint ridge 500 refer to the medial axis or thinned image of the fingerprint ridge 500 (see, for example, FIG. 4C). Thinning essentially gives the center of each fingerprint ridge 500. The fingerprint ridge contour pixels 504 comprise the border pixels where the fingerprint ridge 500 meets the valley.

As described in greater detail herein, embodiments perform texture analysis (e.g., LBP analysis) on certain features of an image (e.g., ridge pixels, skeleton pixel, contour pixels, etc.) to perform spoof detection.

Figure 6:
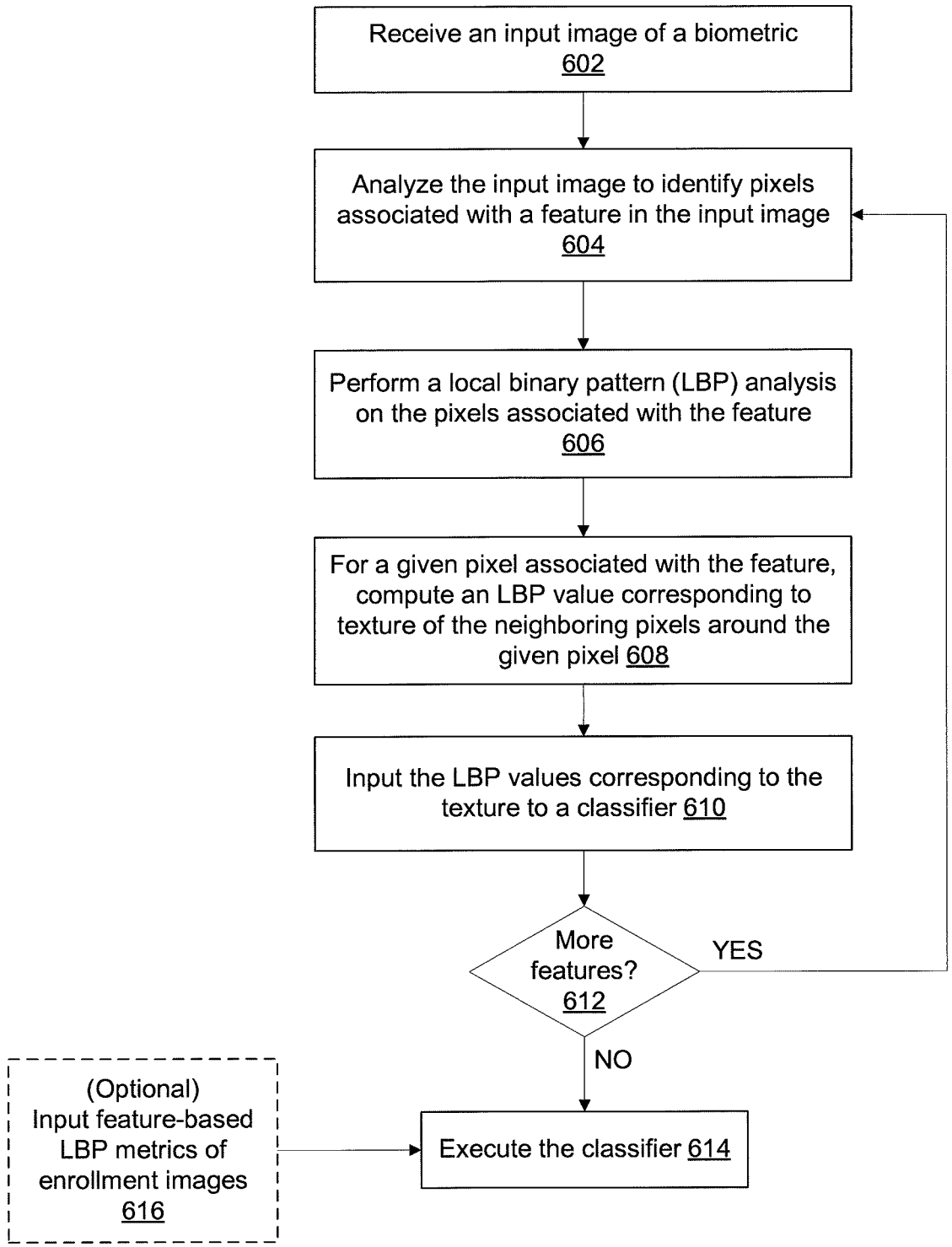
FIG. 6 is a flow diagram illustrating method steps for computing a spoof detection metric based on local binary patterns, according to an embodiment.

FIG. 6 is a flow diagram illustrating method steps for computing a spoof detection metric based on local binary patterns, according to an embodiment. In one embodiment, the method illustrated in FIG. 6 corresponds to step 204 in FIG. 2.

As shown in FIG. 6, at step 602, a processor receives an input image of a biometric (e.g., the image captured at step 202 in FIG. 2). In one implementation, the input image is a grayscale image of a fingerprint.

At step 604, the processor analyzes the input image to identify pixels associated with a feature in the input image. The feature may be, for example, fingerprint ridges in the input image, and the pixels associated with feature may be the fingerprint ridge pixels. For example, the pixel locations of the ridge pixels may be based on a binary version of the input image. In other embodiments, the identified pixels associated with the feature may be: ridge skeleton pixels, contour pixels, fingerprint valley pixels, minutiae points (e.g., fingerprint minutiae points) in the input image, keypoints (i.e., local points of interest) in the input image, or pixels associated with other image features.

At step 606, the processor performs a local binary pattern (LBP) analysis on the pixels associated with the feature. Continuing with the example of the identified feature being fingerprint ridges, LBP is performed on the pixels associated with the fingerprint ridges.

According to various embodiments, LBP is a type of visual descriptor used for classification in computer vision. For a given pixel, LBP operates by comparing the given pixel to its neighboring pixels. For example, LBP may analyze each of a pixel's eight neighbors on its left, right, top, bottom, and four corners (i.e., so-called "eight connected pixels" or "eight connected neighborhood"). Given an intensity value of the given pixel, LBP determines which of the neighboring pixels have greater intensity than the given pixel and which of the neighboring pixels have lesser intensity than the given pixel. Where the given pixel's intensity value is greater than the neighboring pixel's intensity value, LBP assigns that neighboring pixel a "0," otherwise, LBP assigns that neighboring pixel a "1." Note, in other implementations, the values of 0 and 1 may be reversed. The result of such an analysis gives an 8-digit binary number, which may be converted to a decimal in some LBP implementations. Although the example described above performs LBP on a pixel's eight connected neighborhood, other implementations may use a larger radius to capture a pixel's sixteen connected neighborhood. Also, in various implementations, the radius around a pixel that is examined may be a circular arc or a square.

At step 608, for a given pixel associated with the feature, the processor computes an LBP value corresponding to texture of the neighboring pixels around the given pixel. For example, the value corresponding to texture may be a relative pixel intensity value. In some implementations, for a given pixel location, LBP may execute the following equation to determine an LBP value for the given pixel location. The relative 0 or 1 intensity value i of each of the eight neighboring pixels for the given pixel location (x,y) may be input into the below equation to determine an LBP value for the pixel location (i.e., multiply by powers of 2 and sum).

$$LBP_{(x,y)} = (i_1*1) + (i_2*2) + (i_3*4) + (i_4*8) + (i_5*16) + (i_6*32) + (i_7*64) + (i_8*128)$$

Note, that in some implementations, the LBP value is dependent on rotation and in other implementations the LBP value is rotation-invariant. For example, using the equation above to compute the LBP value, the resulting value would depend on which neighboring pixel location intensity value is the first location (i.e., $i_1$) to be input to the equation. Many other LBP techniques can be performed and are also within the scope of the disclosure.

Once LBP is performed on a given pixel location and an LBP value is computed for that pixel location, the processor may generate a statistical distribution of the LBP values of the pixels associated with the feature. In one implementation, the statistical distribution comprises a histogram. The histogram essentially counts the frequency of each LBP value occurring for the analyzed pixels. In the example of using ridge pixels, the histogram provides a count of the LBP values for the ridge pixels. In some LBP implementations, the histogram includes 256 dimensions or "buckets." In other implementations, there are other variants of LBP where some of the 256 dimensions can be collapsed into a single bin, while other dimensions are not collapsed with other dimensions. For example, one variant called "uniform LBP" results in 59 histogram bins instead of 256.

Also, although the technique disclosed herein describes performing LBP analysis, any texture analysis technique can be used, and the technique can be focused to pixels associated with certain features, as opposed to indiscriminately applying the analysis to all pixels in a given patch, as in conventional approaches. For example, any visual descriptor technique can be used that encodes the appearance of a region surrounding a pixel, and more specifically, encodes intensity information from the region surrounding the pixel. Some example techniques include SIFT, BRIEF, BRISK, ORB, and FREAK.

As described herein, performing step 608 is one implementation of performing step 606. As such, step 608 is performed for each pixel associated with the feature being analyzed (e.g., ridge pixels). In other embodiments, step 608 may be performed on only those pixels associated with the feature in a portion of the input image. Still further, in some embodiments, step 608 may be performed on every n pixels associated with the feature in a portion of the input image, where n is greater than or equal to 2. In this manner, not every pixel associated with the feature must be analyzed.

At step 610, the processor inputs the LBP values corresponding to the texture to a classifier. In implementations that involve a statistical distribution (e.g., histogram), the processor may input the counts for each dimensions or bucket of the statistical distribution to the classifier.

At step 612, the processor determines whether pixels corresponding to any other features should be analyzed. For example, as described above, the LBP analysis is performed on the ridge pixels. The LBP analysis can also be performed on the pixels associated with other features, such as on skeleton pixels, contour pixels, fingerprint valley pixels, minutiae point pixels, keypoint pixels, or pixels associated with other features.

If, at step 612, the processor determines that pixels corresponding to any other features should be analyzed, then the method returns to step 604, and steps 604-606-608-610 are executed for the pixels corresponding to those other features. Spoof detection results may be improved in some implementations by performing the analysis in FIG. 6 on multiple features. For example, the skeleton pixels may focus on any variations along the sweat pores, and the contour pixels may focus on the transition area between ridges and valleys. Analyzing pixels for the entire ridge is less focused, but may also be useful as it captures more discerning pixels and should be less prone to noise.

As described, the LBP analysis performed at steps 606-608 can take on many forms. For example, the LBP analysis may be rotation-dependent or rotation-invariant. In some embodiments, if multiple features are being analyzed, the same LBP analysis is performed on each of the different features. In other embodiments, if multiple features are being analyzed, two or more different LBP analyses may be applied to the pixels of the different features.

If, at step 612, the processor determines that no additional pixels corresponding to any other features should be analyzed, then the method proceeds to step 614, where the processor executes the classifier. In one embodiment, the classifier is configured to make a spoof detection determination as to whether the input image is a real finger or a spoofed finger. For example, the classifier may be configured to make the spoof detection determination based on a statistical distribution (e.g., histogram) of LBP values. In another embodiment, the classifier is configured to generate an anti-spoof score and return the anti-spoof score to another entity within the anti-spoof module that makes the spoof/non-spoof decision, e.g., by comparing the anti-spoof score to a threshold. The classifier may be implemented as a neural network, but any classifier is within the scope of the disclosure. The classifier itself can be developed using machine learning methods, where a training set and a test set are created to train and validate the classifier performance. In one embodiment, LBP analysis (i.e., steps 606-608-610) can be performed on the pixels associated with the various features in parallel, such that the results for each feature are input to the classifier at one. In another embodiment, the LBP analysis is performed serially for each feature.

In some implementations, other metrics can also be input into the classifier (e.g., metrics based on an average gray level of ridges, metrics based on an average gray level of valleys, metrics based on one or more values as to whether the input image includes blurred areas, metrics based on one or more values as to whether the input image includes relative lighter areas, metrics based on one or more values as to whether the input image includes relative darker areas, metrics based on texture information, etc.), and the classifier is configured to compute an overall liveness score based on the combination of metrics.

In some embodiments, at step 616, the processor optionally inputs to the classifier feature-based LBP metrics (such as those computed using the method of FIG. 6) of enrollment images. For example, the feature-based LBP metrics of enrollment images may be stored in an anti-spoof template. As described, some embodiments involve the anti-spoof module computing an anti-spoof template that includes anti-spoof metrics derived from enrollment images for the given biometric. In these embodiments, the processor may compute a difference value (or "differential" value) between a value of a given anti-spoof metric in the input image and a corresponding value of the given anti-spoof metric in the anti-spoof template 310. These difference values are then passed to the classifier. In embodiments that do not involve an anti-spoof template, step 616 may be omitted.

Embodiments of the disclosure are related to focusing a texture analysis (e.g., LBP analysis) to specific pixels in an image, thereby getting away from the conventional notion of applying LBP to patches of an image indiscriminately. Focusing the analysis on the areas of an image that contain the information of interest is an advancement in image analysis, especially in the area of spoof detection. So while this disclosure has applicability specifically to spoof detection for fingerprints, the technique may apply to many other image analysis problems as well. By way of example, the disclosed embodiments could be applied to texture analysis problems where textures are contained within a given object (e.g., analyzing patterns on balloons in an image of a party scene).

Although this invention describes optical object imaging in the context of fingerprint image sensing, the method and system may be used to image any object.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device, comprising:
    a biometric sensor; and
    a processing system configured to:
        receive, from the biometric sensor, an input image of a biometric;
        analyze the input image to identify pixels associated with a first feature in the input image, wherein the input image comprises an image of a fingerprint, and wherein the pixels associated with the first feature comprise fingerprint valley pixels;
        perform a local binary pattern (LBP) analysis on the pixels associated with the first feature, comprising computing, for a given pixel of the pixels associated with the first feature, an LBP value corresponding to intensity information of one or more neighboring pixels around the given pixel, wherein the intensity information indicates an average gray level of the one or more neighboring pixels around the given pixel; and
        determine whether the input image is a replica of the biometric based on results of performing the LBP analysis on the pixels associated with the first feature, wherein the LBP analysis is performed on less than all pixels in the input image.

2. The device of claim 1, wherein the processing system is further configured to:
    analyze the input image to identify pixels associated with a second feature in the input image; and
    perform an LBP analysis on the pixels associated with the second feature;
    wherein determining whether the input image is a replica of the biometric is further based on results of performing the LBP analysis on the pixels associated with the second feature.

3. The device of claim 2, wherein the pixels associated with the second feature comprise one or more of:
    pixels associated with fingerprint ridge skeletons;
    pixels associated with fingerprint ridge contours, which comprise pixels at border pixels where a fingerprint ridge meets a fingerprint valley in the fingerprint;
    pixels associated with fingerprint minutiae; and
    pixels associated with fingerprint keypoints.

4. The device of claim 2, wherein the LBP analysis performed on the pixels associated with the first feature is the same as the LBP analysis performed on the pixels associated with the second feature.

5. The device of claim 2, wherein the LBP analysis performed on the pixels associated with the first feature is different than the LBP analysis performed on the pixels associated with the second feature.

6. The device of claim 1, wherein the processing system is further configured to:
    generate a statistical distribution of the LBP values of the pixels associated with the first feature;
    wherein determining whether the input image is a replica of the biometric is based on the statistical distribution.

7. The device of claim 6, wherein the statistical distribution comprises a histogram.

8. The device of claim 1, wherein the processing system is further configured to:
    perform an LBP analysis on one or more enrollment images of the biometric stored in a template storage;
    wherein determining whether the input image is a replica of the biometric is further based on a differential between results of performing the LBP analysis on the pixels associated with the first feature and results of performing the LBP analysis on the one or more enrollment images of the biometric.

9. The device of claim 1, wherein performing the LBP analysis on the pixels associated with the first feature is performed after determining that the input image comprises a match to one or more enrollment images of the biometric stored in a template storage.

10. The device of claim 1, wherein the biometric is a fingerprint, and wherein the replica comprises a gelatin mold, a graphite mold, or a wood glue mold of the fingerprint.

11. The device of claim 1, wherein the one or more neighboring pixels around the given pixel comprise eight pixels around the given pixel, including pixels on a top, a bottom, a left, a right, and at four corners of a location of the given pixel.

12. A method for performing spoof detection, comprising:
    receiving, by a processor from a biometric sensor, an input image of a biometric;
    analyzing, by the processor, the input image to identify pixels associated with a first feature in the input image, wherein the input image comprises an image of a fingerprint, and wherein the pixels associated with the first feature comprise fingerprint valley pixels;
    performing, by the processor, a local binary pattern (LBP) analysis on the pixels associated with the first feature, which comprises computing, for a given pixel of the pixels associated with the first feature, an LBP value corresponding to intensity information of one or more neighboring pixels around the given pixel, wherein the intensity information indicates an average gray level of the one or more neighboring pixels around the given pixel; and
    determining, by the processor, whether the input image is a replica of the biometric based on results of performing the LBP analysis on the pixels associated with the first feature, wherein the LBP analysis is performed on less than all pixels in the input image.

13. The method of claim 12, further comprising:
analyzing the input image to identify pixels associated with a second feature in the input image; and
performing an LBP analysis on the pixels associated with the second feature;
wherein determining whether the input image is a replica of the biometric is further based on results of performing the LBP analysis on the pixels associated with the second feature.

14. The method of claim 13, wherein the pixels associated with the second feature comprise one or more of:
pixels associated with fingerprint ridge skeletons;
pixels associated with fingerprint ridge contours, which comprise pixels at border pixels where a fingerprint ridge meets a fingerprint valley in the fingerprint;
pixels associated with fingerprint minutiae; and
pixels associated with fingerprint keypoints.

15. The method of claim 12, wherein performing the LBP analysis comprises performing rotation-invariant LBP analysis or performing the LBP analysis comprises performing rotation-dependent LBP analysis.

16. The method of claim 12, wherein performing the LBP analysis on the pixels associated with the first feature is performed after determining that the input image comprises a match to one or more enrollment images of the biometric stored in a template storage, the method further comprising:
performing an LBP analysis on one or more enrollment images of the biometric stored in a template storage, wherein determining whether the input image is a replica of the biometric is further based on a differential between results of performing the LBP analysis on the pixels associated with the first feature and results of performing the LBP analysis on the one or more enrollment images of the biometric.

17. The method of claim 12, wherein the one or more neighboring pixels around the given pixel comprise eight pixels around the given pixel, including pixels on a top, a bottom, a left, a right, and at four corners of a location of the given pixel.

18. A non-transitory computer-readable storage medium storing instructions that, when executed by a processor, causes a computing device to perform spoof detection, by performing steps comprising:
receiving, from a biometric sensor, an input image of a biometric;
analyzing the input image to identify pixels associated with a first feature in the input image, wherein the input image comprises an image of a fingerprint, and wherein the pixels associated with the first feature comprise fingerprint valley pixels;
performing a local binary pattern (LBP) analysis on the pixels associated with the first feature, which comprises computing, for a given pixel of the pixels associated with the first feature, an LBP value corresponding to intensity information of one or more neighboring pixels around the given pixel, wherein the intensity information indicates an average gray level of the one or more neighboring pixels around the given pixel; and
determining whether the input image is a replica of the biometric based on results of performing the LBP analysis on the pixels associated with the first feature, wherein the LBP analysis is performed on less than all pixels in the input image.

\* \* \* \* \*